Oct. 26, 1937.   H. McCORNACK   2,097,128
CENTRIFUGAL CLUTCH
Filed Feb. 26, 1934
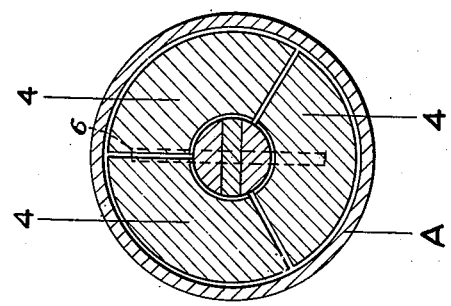
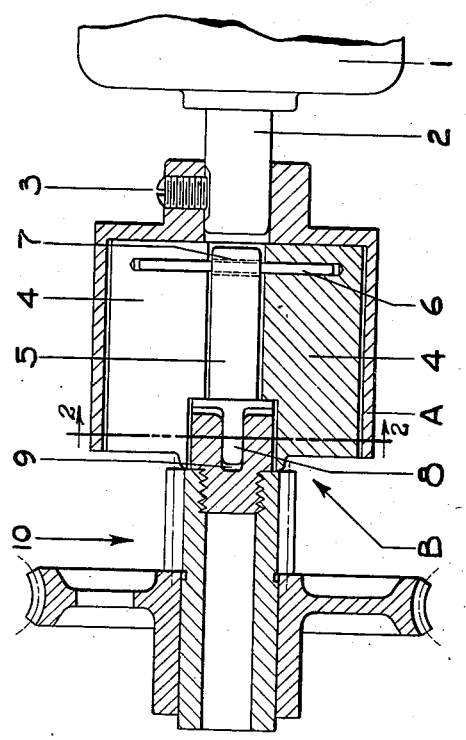
INVENTOR.
BY Herbert McCornack.
ATTORNEYS.

Patented Oct. 26, 1937

2,097,128

UNITED STATES PATENT OFFICE 2,097,128

CENTRIFUGAL CLUTCH

Herbert McCornack, Glen Ridge, N. J., assignor to McCornack Inventions, Inc., Howey, Fla., a corporation of Florida Application February 26, 1934, Serial No. 712,871

4 Claims. (Cl. 192—103)

The principal object of my invention is to provide for more gradual engagement of the driving and driven clutch members than in present practice.

It is old to use a centrifugal clutch in which the centrifugally engaging members are carried by and directly actuated by the rotation of the driving clutch members. This results, under many loads, in excessive starting torque for electric motors.

In my improved clutch I overcome this, too sudden, engagement of the clutch by making the centrifugally engaging members part of the driven clutch member so that they are directly actuated by the rotation of the driven member. The important advantage of this improved clutch construction is that the centrifugally engaging members are brought to the speed of the driving members gradually and engage the driving clutch member directly as the square of the speed of the clutch member that is being driven.

Another important object of this improved clutch is to reduce to the minimum, communication of vibration from the motive means and from the clutch to the driven machine. This object I accomplish by means of flexible connection between the driving clutch and the driven machine.

Fig. 1 is a sectional elevation of my clutch in relation to motive means and driven mechanism.

Fig. 2 is a cross-sectional view at line II—II, Fig. 1.

In Fig. 1, A is the driving clutch member, 1 is the motive means, 2 is the motive shaft attached by set screw 3, in rotative engagement with driving clutch member A. B represents driven clutch member consisting of a plurality of centrifugally, expansible members 4—4, a pin 6 carried by expansible members 4—4, which passes loosely thru hole 7 in member 5 and which provides for the free radial expansion of members 4—4, 5 is a floating torque transmitting member between the driven member B and a driven machine 10. Pin 6 is free to move with respect to all contacting elements, 8 is a tongue on floating shaft 5, which loosely engages slot 9 in the driven machine 10 and transmits the torque of driven clutch member B to machine 10.

In operation, clutch member A starts with no resistance excepting the static engagement of the floating sectional members 4—4. Thru the static engagement of members 4—4 sufficient torque is transmitted to start the driven clutch members B and the driven machine 10 and to cause members 4—4 to expand centrifugally against the wall of the cylindrical housing A. As the speed of the driven machine 10 increases, the centrifugal pressure of the floating members 4—4 increases directly as the square of the speed of the driven machine 10 until the speed of machine 10 has attained the speed of the driving member A when the engagement between the driving member A and the driven members B becomes fixed and constant.

As the floating sectional members 4—4, under centrifugal pressure transmit torque, thru axial member 5, member 5, because of its floating engagement with members 4—4, by means of pin 6, which passes loosely thru hole 7 in said shaft and because of its free engagement at tongue 8 and slot 9 with driven machine 10, transmission of vibration from the motive means and from the clutch to the driven machine is reduced to the minimum.

The preferred form of housing is cylindrical, however, any form of chamber concentric with the axis of the clutch might be used in the application of this improved clutch principle. The preferred means for supplying the static engagement of members 4—4 with cylinder A by which the starting torque is transmitted, thru said members, is the weight of members 4—4.

I claim:

1. In a centrifugal clutch, a driving member consisting of a housing having a cylindrical chamber, motive actuating means for said housing, a plurality of centrifugally expanding, frictional members located within said housing, a driven mechanism and a floating torque transmitting member constructed to hold said centrifugal members in assemblage and to transmit the driving torque from said centrifugal members to the driven machine.

2. In a centrifugal clutch, a driving member consisting of a housing having a cylindrical chamber, motive actuating means for said housing, a plurality of centrifugally expanding, frictional members located within said housing a driven mechanism, an unjournaled torque transmitting member loosely engaging said frictional members and having floating engagement with the driven machine.

3. In a centrifugal clutch, a driving member consisting of a housing, motive actuating means for said housing, a plurality of expanding members located within said housing, a driven mechanism and an unjournaled torque transmitting member loosely engaging said frictional members and having floating engagement with said driven mechanism.

4. In a centrifugal clutch a driving member consisting of a housing, motive actuating means for said housing, a plurality of expanding members located within said housing, a driven mechanism and a torque transmitting member between said expanding members and the driven mechanism, said torque transmitting member having yielding connections at each end.

HERBERT McCORNACK.